March 14, 1939.　　　　D. C. HEIM　　　　2,150,767
METHOD OF TREATING PLANTS FOR PARASITES
Original Filed July 26, 1932　　4 Sheets-Sheet 4

Inventor
Daniel C. Heim
By Walter W. Burns
Attorney

Patented Mar. 14, 1939

2,150,767

UNITED STATES PATENT OFFICE 2,150,767

METHOD OF TREATING PLANTS FOR PARASITES

Daniel C. Heim, Sunbury, Pa., assignor to A. B. Farquhar Co., Limited, York, Pa., a limited partnership of Pennsylvania Original application July 26, 1932, Serial No. 624,783. Divided and this application December 20, 1935, Serial No. 55,492

4 Claims. (Cl. 43—148)

This invention relates to a method of killing insects and fungi on plants and has particular relation to carrying out a process in passing over fields of growing crops and in depositing dust in such a way as to kill any insects or fungus which may be present.

In dusting plants efficiently, it is necessary to place the dust on the undersides of the lower leaves of the plants. Considering potatoes for example, the lower leaves must receive a deposit of dust to provide protection from such pests as late blight, leaf hoppers and aphis.

The leaves of the vines are sometimes in thick layers adjacent the ground and unless extraordinary means are used to drive the dust to the underside of the vine, it is impossible to give thorough protection.

The leaf hopper, for example, lays eggs in slits which are made on the underside of the lower and older leaves. These eggs hatch and produce nymphs which resemble the parents except that they do not have the wings of the mature hopper. The shell of the nymph is stiff and not very elastic. As it sucks juices from the plant, it expands in size. The shell then splits and falls off, a new shell forming on the skin. This process is repeated many times until the mature hopper is produced.

During the time the insect is emerging from its hard skin or shell, its body is very moist, this moisture being necessary to make the skin or shell slip off easily. The use of dusts which produce sulphuric acid fumes which are hygroscopic, will kill the nymphs. This is brought about by the acid fumes absorbing the moisture on the skins of the nymphs and making it impossible for the insect to escape from its shell. This causes it to die.

As these leaf hoppers are laying eggs continuously from and after the time they mature, it will be seen that the process of production is continuous. However, the materials usually used in these dusting operations have no effect upon the egg itself. For this reason, the dusting process must be repeated in order to kill new nymphs which were not hatched at the time of the last treatment. Moreover, the mature leaf hoppers come from apple trees, bean plants or other potato fields. The coating of the upper surfaces of the leaves will have no effect upon these nymphs which are on the underside. The mature hoppers do not stay long enough on any one plant to be affected and since they die shortly after laying the eggs, it is clear that in order to do any good, these nymphs must be killed.

It is therefore clearly seen that a definite and effective method must be provided for treating the undersides of the leaves. It has therefore been determined that the only way to deposit the dust on the underside of the plant leaves is to have the dust laden air travelling horizontally adjacent the ground.

Similarly, the late blight while it may not be present for one or more years, in succession, is the most dreaded of the potato plant enemies. Since there is no way of predicting when it will appear and since it first appears on the undersides of the lower and older leaves, any treatment of the plant which does not effectively treat the underside of the lower leaves, will not protect the plant.

In a like manner, the aphis or plant lice, which often attack and quickly kill the plants of whole potato fields, first appear and start breeding on the undersides of the lower leaves. They do not appear until the plant has made considerable growth and are worse on heavy matted fast growing plants. These aphis are hard to kill. They do not moult and therefore, sulphuric acid fumes are harmless to them. Practically the only way known for killing these aphis is by gas. For this reason any method will be more effective if the gas used is kept in contact with the plant for a longer period of time. The longer the period of contact of the gas and plant, the greater will be the chances of effectively killing the aphis.

From the above discussion, it will be clear that in order to be very effective on potato plants for example, any method for treating the plants, must concentrate their action close to the ground and effectively treat the undersides of the lower and older leaves and must also treat the plants in a concentrated manner and for the longest possible time.

It will also be clear that to produce these results, the plants must be isolated for as long a time as possible from the surrounding air of the field to prevent spreading of the dust and gas and the treatment must involve a plan for either getting under the lower leaves or turning them over for treatment or both.

The primary object of this invention is the provision of an improved dusting process for distributing dust to the surfaces of plants without injuring them.

Another object of the invention is the provision of an improved plant treating process which in treating the plants will hold them in intimate contact with the gases for a prolonged time.

Still another object of the invention is the provision of an improved process for treating plants which involves use of a chamber having an imperforate top, a side curtain extending on the sides and rear and reaching from the top to a line just above the ground with means for forcing the air, carrying the plant treating chemicals, rearwardly into the chamber.

A further object of the invention is the provision of a process of dusting plants which consists in passing a box-like dust-laden air container over plants, forcing the dust-laden air in at the forward end of the box and confining the egress of the dust-laden air to places adjacent the ground at the sides and rear of the container, thereby giving a swift horizontal movement to the dust laden air with a consequent thorough contact with the underside of the leaves adjacent the ground.

Other and further objects will be apparent to those skilled in the art from a reading of the complete specification and claims.

Referring to the drawings wherein I have illustrated an embodiment of a machine for the practice of my invention.

Figures 3 and 3a are side elevations of my machine.

Figure 1:
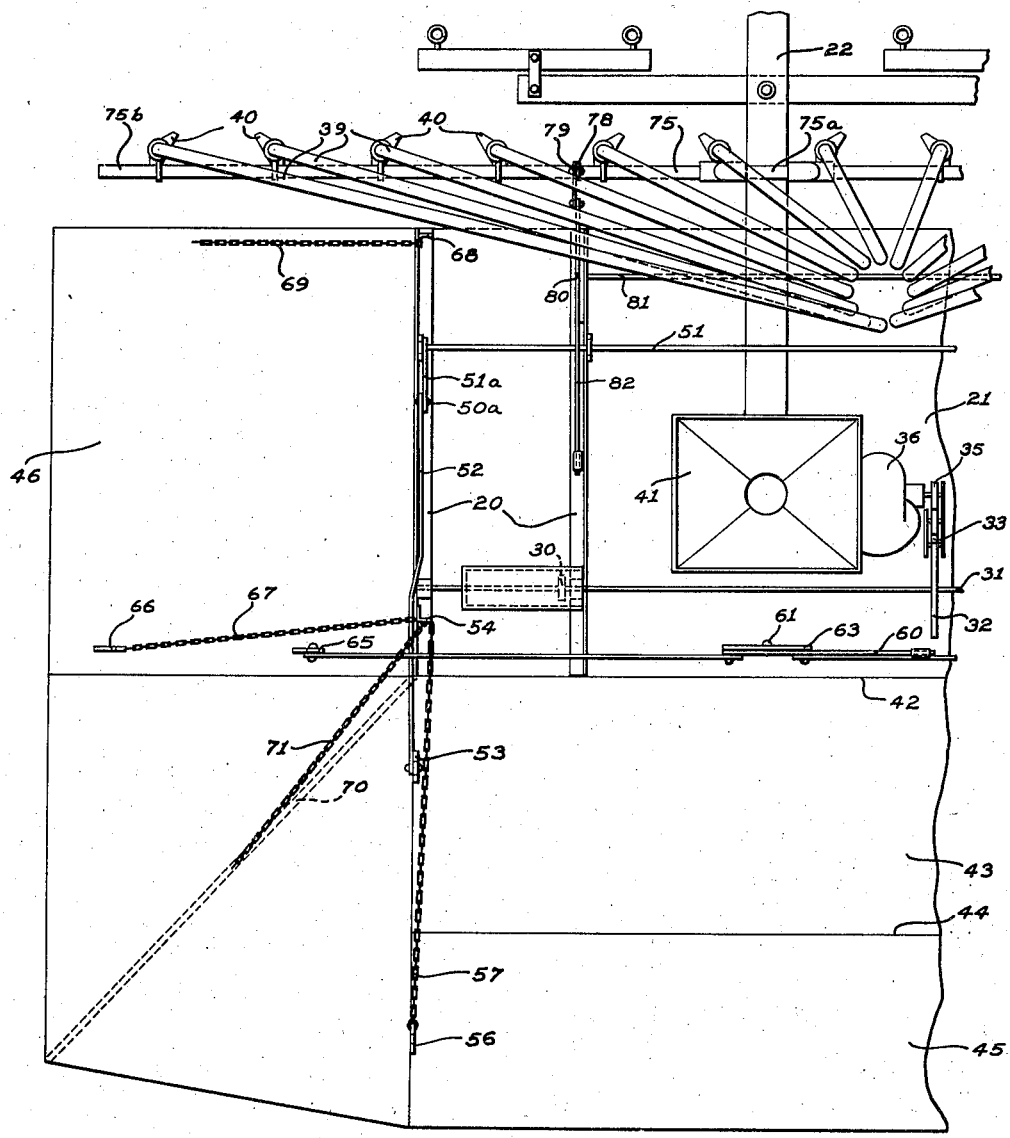
Figure 1 is a plan view of my machine.
Figure 2:
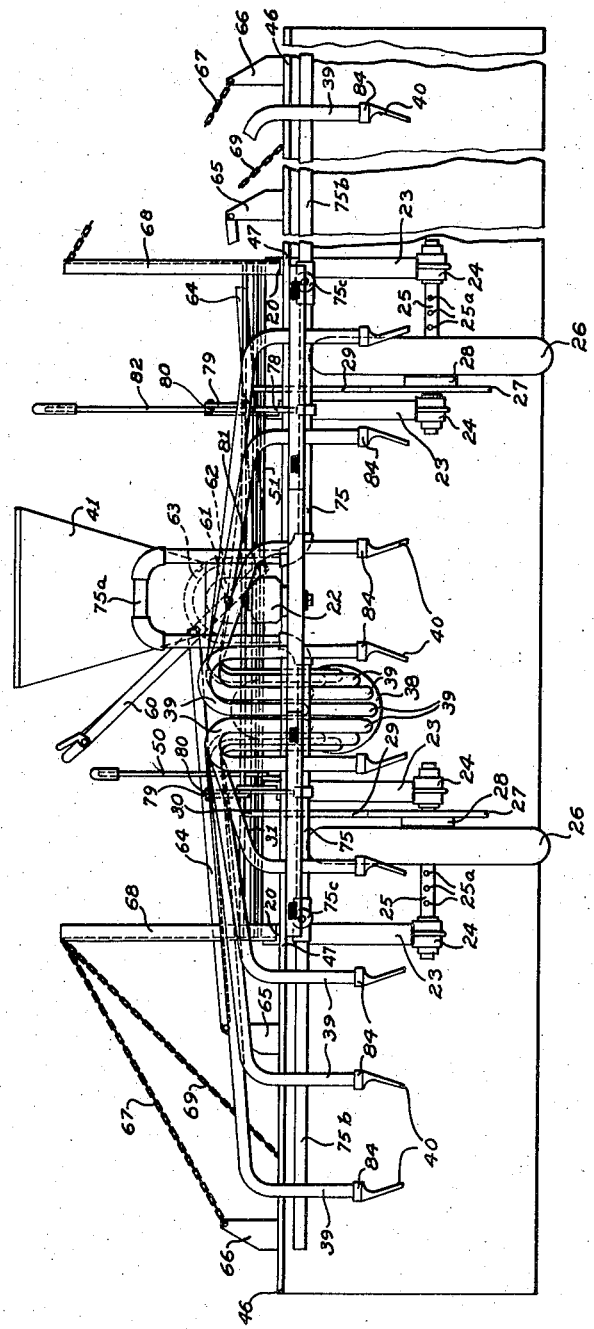
Figure 2 is a front elevation.
Figure 3:
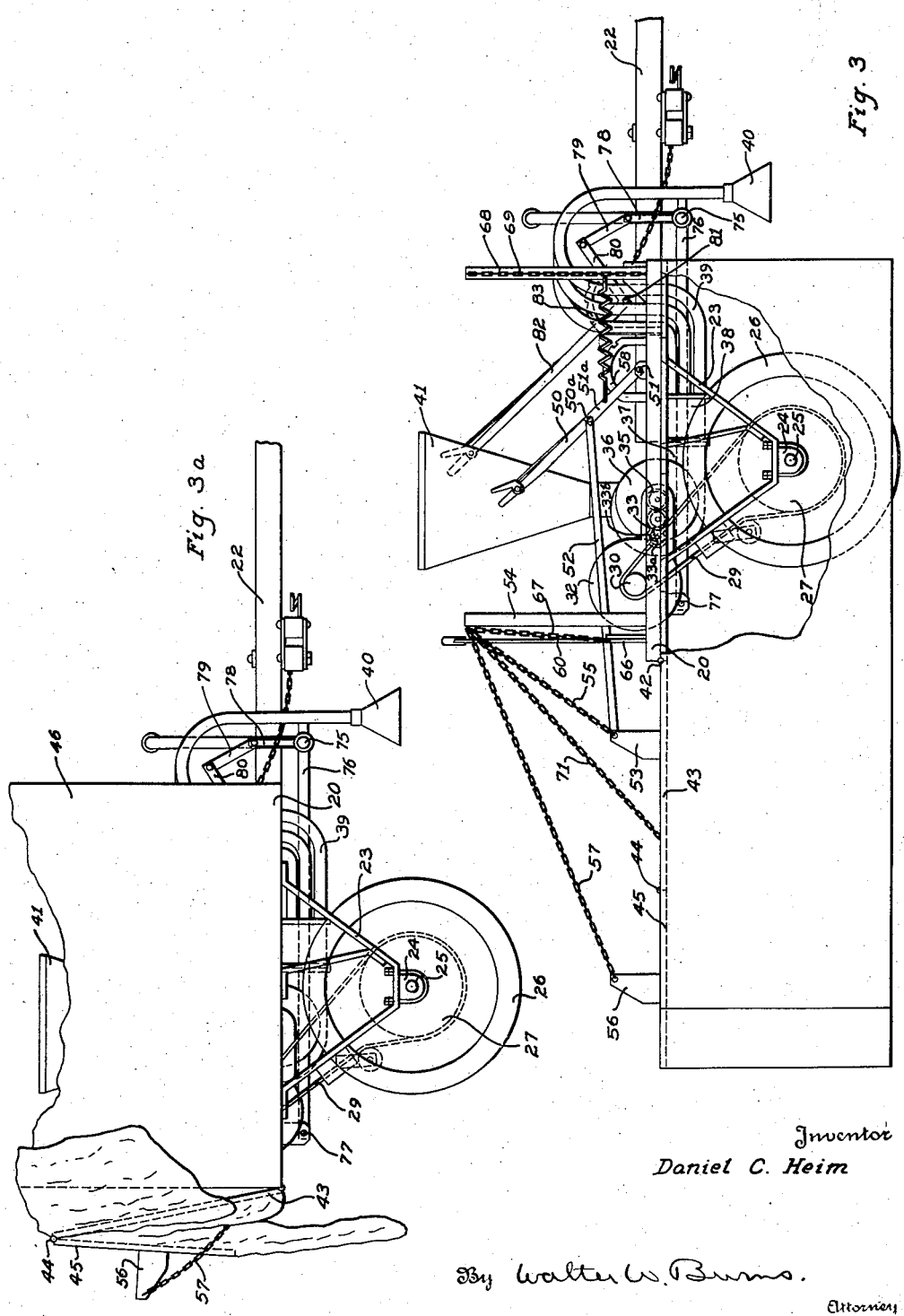
Figure 4:
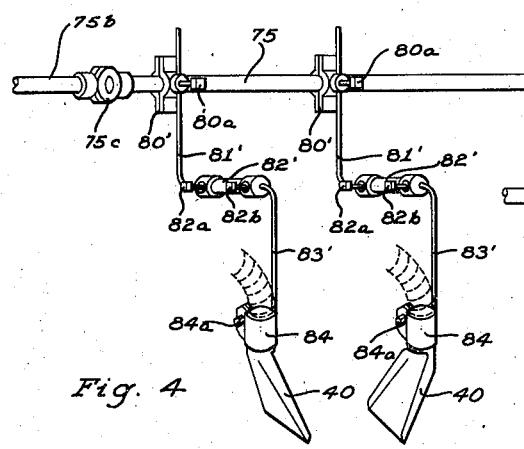
Figures 4 and 5 are detail views showing the adjusting means for the nozzles.
Figure 5:
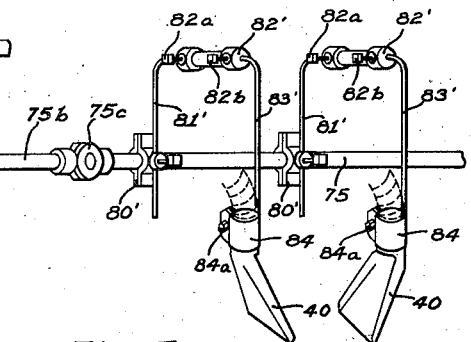
Figure 6:
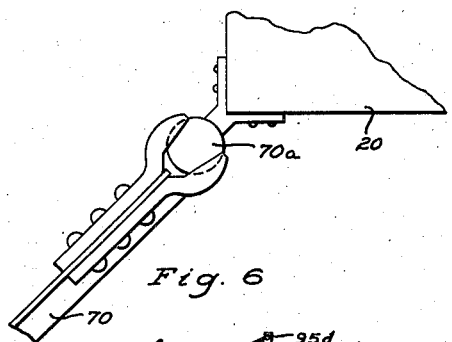
Figure 6 is a detail view of the swivel joint for the stiffening member of the corner sections of the top.
Figure 7:
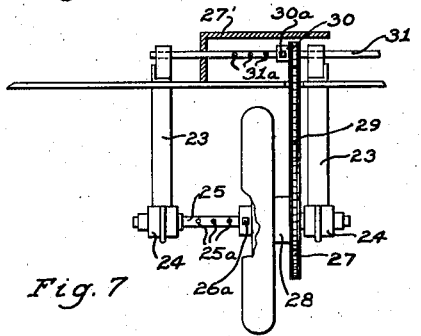
Figure 7 is a view showing the means for adjusting the wheels laterally to provide for different widths or rows.
Figure 8:
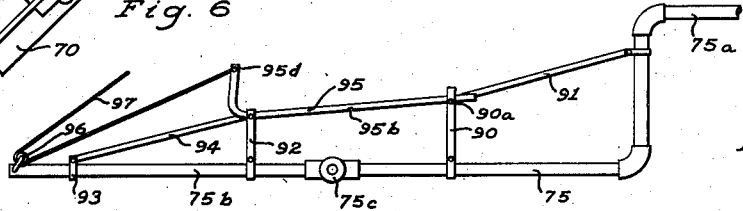
Figures 8 and 9 are front views of the lifting means for the extensions of the nozzle boom.
Figure 9:
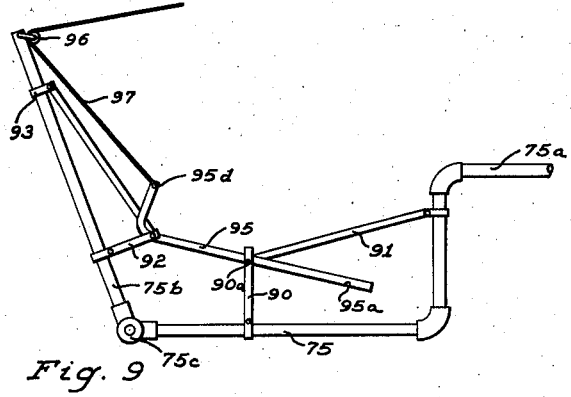

In all of the figures parts are broken away for clearness.

Similar reference characters refer to the same or similar parts throughout the specification and drawings wherein I have illustrated a machine for carrying out my invention.

A main frame 20 carries a platform 21 which extends over the whole area of the frame. This platform is preferably of sheet steel and forms a top or cover for the chamber, for a purpose to be described.

To the forward end of the frame 20 is secured a suitable draw bar or tongue 22. To the underside of the frame 20 are secured axle-supported braces 23.

At the lower portions of the braces 23 are secured axle boxes 24 in which are secured axles 25. Adjustably mounted along the axles 25 are wheels 26. The axles 25 are provided with a series of counter sinks or depressions 25a along the length of the axle with which set screws 26a may be registered to prevent relative movement of the axle 25 to the wheel 26 except during the adjustment operation.

The purpose of the adjustment is to provide for the proper spacing of the wheels so as to have them pass along the lines midway between the rows. The wheels themselves, have many important features which render them particularly adapted to the use for which they are designed. They are of the disk type which enables them to shed the vines or plants without having them tangled in spokes or other obstructions. In addition to the disk feature and more important is the fact that the wheels are provided with low-pressure pneumatic tires. These pneumatic tires are not used for the purposes for which pneumatic tires are usually used. In the usual vehicle, pneumatic tires are applied to lessen the jar and shock to the person or persons carried by the vehicle and also to lessen the wear and tear on the vehicle parts incident to the shocks caused by ground surface irregularities. In the use of vehicles such as the instant case, the soft ground over which the vehicle travels, furnishes the necessary shock absorbing action. The purpose of the present use of these soft pneumatic tires, is to save injury to the vines and also reduce the displacement of the roots. It has been found by actual experience that with tires such as herein described, the vines are not only injured by contact with hard metal of the usual wheel in passing, but also even when vines actually get under the wheels, the vines are forced into the ground, the surface of the tires having a "give" which prevents injury to the plants.

By experiment, it has been definitely determined that an increase in yield has been obtained by the use of these wheels due to absence of destruction of the vines and displacement of roots during cultivation. The absence in root displacement is brought about by the greater ground engaging surface of the tire and also by the fact that the under surface of the contacting portion of the tire is generally flat and has no fixed protrusion into the ground as is the case at the bottom portion of a metal wheel.

It is to be also noted that the wheels 26 are so placed beneath the platform 21 that it is not necessary to provide openings in the platform 21 to provide clearance. This feature is important as it makes possible an imperforate platform to facilitate holding the dust and gas laden air confined within the chamber to be later described.

To each wheel 26 is revolubly secured a sprocket wheel 27 through a suitable ratchet device 28 to cause a free action between the wheel 26 and the sprocket 27 when the former is backing relative to the latter. On this sprocket wheel 27 runs a chain 29 which operates a small sprocket 30 on the top of the platform 21. This sprocket 30 is secured to a shaft 31. The shaft 31 has one such sprocket 30 at each of its ends for driving connections from the respective wheels 26.

Along the shaft 31 and spaced at intervals corresponding to the intervals between the countersunk depressions 25a, are countersunk depressions 31a for registry with set-screws 30a of the small sprockets 30.

When an adjustment of the sprocket wheel 27 and its wheel 26 is made along the axle 25, a corresponding adjustment of the small sprocket 30 is made along its shaft 31. Boxes 27' are provided to cover the small sprockets 30 and the openings in the platform through which the chains 29 pass from the driving sprocket 27 to the small driven sprocket 30.

On the shaft 31 is mounted a drive gear 32, which meshes with a driven pinion 33. The pinion 33 is keyed to shaft 33a and on the opposite end of shaft 33a is keyed pinion 33b, which meshes with a speed-up gear mechanism; this latter through idler gears meshes with the pinion 35, which drives a blower 36. The blower 36 is connected to a delivery tube 37 which in turn is connected to a distributing head 38. The distributing head 38 is connected to tubes 39 which extend to nozzles 40. I preferably provide two of these nozzles 40 for each separate row to be dusted. By this construction, one nozzle may be directed toward the ground beneath each side of each separate row. Such an arrangement is effective to place the dust on the undersides of the lower, older leaves of the plants by turning them over to place their under surfaces in position to be contacted by the dust and gas-laden air.

A dust hopper 41 and suitable delivery and mixing devices are provided to deliver the dust to the fan in condition to be delivered. As these form no part per se in the present invention they will not be described further in detail.

I will now describe the curtain structure which is important in the carrying out of my invention. Hinged at 42 (Fig. 1) to the rear of the main frame 20 is a frame 43 which together with its cover, I term the inner rear frame. To the rear edge of this inner rear frame, at 44, I pivot the outer rear frame 45 which is similar in construction to the inner frame 43. The covers for these frames are of duck or any suitable material.

Referring particularly to Figure 2, the side curtain frames 46 are hinged to the main frame 20 at 47. These frames 46 are covered with duck or any suitable material.

In order to raise and lower the rear curtain frames, I provide a lever operated device. A lever 50 is connected to a transverse shaft 51 which has at each of its opposite ends a short crank lever arm 51a. At the upper end of the short lever arms 51a at the points 50a, are connected links 52 which are connected at their rear ends to gusset plates 53 which operate as crank arms to respectively assist in raising the outer and inner rear curtain frames 43 and 45. Adjacent each side of the platform 21 and near its rear edge are support posts 54. Support chains 55 are connected at one end to the upper ends of the posts 54 and at their respective lower ends to the pivot point of the link 52 to the gusset plate 53. The chain 55 is of a sufficient length to be taut when the inner rear curtain frame 43 is in a horizontal plane. Connected to each side edge of the outer rear curtain frame 45 is a gusset plate 56 to which at its upper end is secured a chain 57 connected at its other end to the support post 54. This chain 57 is of a sufficient length to be taut when the inner and outer rear curtain frames 43 and 45 are in a horizontal position.

It will be observed that the lever 50 has a quadrant 58 having suitable notches to receive the locking dog of the lever 50 to secure the rear curtain frames in lowered or raised position. When it is desired to raise the rear curtain frames 43 and 45, the lever 50 as illustrated in Fig. 3, is released from the quadrant 58 and swung in a clockwise direction until the dog may be placed in the other notch of the quadrant 58.

As the lever 50 is swung, the links 52 are drawn forward. This swings the inner rear curtain 43 about the pivot 42. Coacting with the chain 57, the outer edge of the frame 43 raises the inner edge of the outer rear curtain frame 45. Because the pivot 44 swings toward the upper end of the support post 54, the chain 57 slackens and the outer frame 45 hangs vertically as it is drawn inwardly toward the rear edge of the platform 21.

When it is desired to lower the rear frames, the lever 50 as illustrated in Fig. 3 is swung in a counterclockwise direction. The inner frame 43 swings outwardly carrying the outer frame until the chain 57 begins to tighten. Then when both frames reach the horizontal, the dog of the lever 50 engages its notch in quadrant 58, the chains 55 and 57 are both taut and the coacting parts are in their proper positions.

To operate the side curtain frames, a somewhat similar construction is provided with the exception that there is only one frame at each side. A lever 60 is pivoted at 61 to a suitable support 62.

A quadrant 63 is provided with notches to receive the dog of the lever 60 when the latter has moved the side curtain frames to the upper or lower position. Connected to the lever 60 respectively above and below the fulcrum point 61 are links 64 which at their outer ends are pivoted to gusset plates 65 which are connected to the side curtain frames 46 adjacent the rear corners of the platform 21. It should be here noted that the side curtain frames are of a length sufficient to extend from the forward end of the platform to near the rear edge of the platform.

The outer portions of the side curtain frames 46 are provided with gusset plates 66 at the upper ends of which are secured chains 67. The other ends of the respective chains 67 are secured to the support posts 54. At the forward portion of the platform 21 and at its sides are secured support posts 68. Chains 69 are secured at their lower ends to each forward edge of the side frames 46 and at their upper ends to the support posts 68. The chains 69 are of a sufficient length that they are taut when the curtain frames 46 are in a horizontal plane.

Connected to the outer edges of the side and outer rear curtain frames, is a curtain which is preferably continuous from one forward end of the outer edge of one side frame, around the rear of the machine back to a corresponding place on the opposite side frame. This curtain extends from the outer edges of the side and rear outer curtain frames to a line adjacent the ground. In order to support the curtain from the rear of the outer edge of the side curtain frame to the end of the outer rear frame, on each side, I have provided a stiffening rod 70 which is secured to that portion of the top which connects the side and rear curtain frames and acts as a corner filler. This stiffening rod is preferably sewed in the canvas or other material forming the corner section of the top and is provided with a chain 71 which connects to the post 54 in a manner similar to the chain 69 already described. This chain 71 is of sufficient length to be taut when the rod 70 is in a horizontal position.

The rod 70 is provided at its inner end with a swivel joint 70a which will permit of the raising of either the side or rear curtains prior to the other, or they may be raised simultaneously if desired. After both curtains are raised, the chain 71 may be utilized to draw the stiffening rod 70 and its corner section close to the post 54.

In operation, the delivery nozzles are lowered to positions adjacent the ground with their openings for example, slightly toward the rear and in a direction toward the plant. The exact angle relative to the line of travel would be determined by the field conditions and the result desired. In use, of course, the curtains will be in lowered position. When the clutch is thrown in, power is transmitted to the blower and feeder devices. The dust laden air is delivered rearwardly. The platform 21, the side curtain frames 46 and the rear curtain frames 43 and 45 and the coverings and corner sections for the frames form an imperforate top for the dust chamber therebelow.

As already described, there is a continuous curtain from the front edge of one side around the rear to the corresponding place on the opposite side. The complete structure forms a box having a chamber closed at the top, at the bottom (by the ground) and at the sides and rear (by the curtain), the front only being open for the delivery of the dust and gas laden air to the chamber. As the air pressure is from the front and mainly to the rear, the curtain will be caused to slightly "balloon", with a consequent slight raising of the lower edge—somewhat at the sides, but more at the rear.

The result is that the dust and gas laden air which escapes under this curtain goes out with great velocity causing the leaves to turn over and resulting in placing a thorough deposit on the undersides of the lower leaves which is the most important part of the plant to reach. This action is caused partly by the eddy currents which get under the leaves and partly by the high velocity of the air which turns the leaves over and over to place them in the path of the dust and gas. Moreover, the long chamber with its gaseous content keeps the plant in contact with the gases for an appreciable time.

In order to raise and lower the nozzles as above mentioned, I provide a boom 75 to which the nozzles 40 and their flexible tubes 39 are suitably secured by adjustable clamps. The boom 75 is provided with a U-shaped portion 75ᵃ which connects the two main portions together and straddles the tongue or draw bar member 22 to provide for raising and lowering the boom. Extensions 75ᵇ are pivoted at 75ᶜ for folding when the implement is in transport or road position.

The boom 75 is connected to the forward ends of two swinging reach rods 76 which are pivoted at their rear ends to the underside of the platform 21 as at 77. The boom 75 is supported by hangers 78 adjacent the middle of the two main portions of the boom 75. These hangers are connected with links 79 which, in turn, are connected to the bell crank levers 80 of the shaft 81. A lever 82 operates the shaft 81 and is provided with a suitable toothed quadrant 83. By this lifting mechanism the nozzles 40 may be placed at any desired height relative to the ground.

To support the nozzles 40 from the boom 75, I provide special means. At the desired intervals, clamps 80' are secured in adjusted positions along the boom 75 and its extensions 75ᵇ. In each of the clamps 80' is an opening to adjustably secure in place an adjusting link 81' which is held in place by a set screw 80ᵃ. At one end of the adjusting link 81' is an adjusting sleeve 82' which is here shown, though not necessarily, as being separate from but secured to a right angle portion of the link 81' by the set screw 82ᵃ. Secured in the adjusting sleeve 82' is the nozzle link 83' which is provided with a right angle portion which is held in place by the set screw 82ᵇ. At the outer end of the link 83' is a nozzle clamp 84 which holds the nozzle 40 and the lower end of the flexible tubing 39 which leads from the distributing head 37. From an inspection of the drawings it will be clear that for use on low plants, the adjusting link 81' is inserted in the clamp 80' from below. In using the nozzles on very high plaints the adjusting screw 80ᵃ is loosened, the adjusting link 81' withdrawn and replaced from above. The adjustment screws 82ᵃ and 82ᵇ are loosened and readjustments of the parts 82' and 83' are made. By adjusting the nozzles 40 in the clamp members 84, and tightening the adjusting nut 84ᵃ, the nozzle may be set at the desired angle.

From the foregoing description of the structure shown on Figures 4 and 5, it will be clear that many different types of adjustments may be made. By the set screw 80ᵃ, the height of the nozzles may be controlled and when very high plants are to be treated, the set screws 82ᵃ and 80ᵃ are used to place the parts in position as shown in Figure 5.

Without changing height, by loosening the set screw 80ᵃ, the whole device may be swung from side to side. This changes the lateral position and also moves the nozzle forwardly and rearwardly. The lateral adjustment may be changed by varying the position of the clamps 80' on the boom 75.

By the adjusting screw 82ᵇ, the nozzle may be swung from side to side, the angle of the nozzle with relation to the ground may be changed and its angle with relation to the line of travel may be varied.

By adjustment after loosening the nut 84ᵃ, the nozzle may be turned about the axis of the clamp 84.

It is thus clear that any desired adjustment of the nozzle may be obtained.

In Figures 8 and 9, I have illustrated a portion of the nozzle supporting boom, Figure 8 showing the end extension in its operative position and Figure 9 illustrating the same in raised position.

Supported on the boom 75 is an upright stop member 90 having a detent 90ᵃ. The upper end of the stop member 90 is held in place by the brace member 91 which connects to the U-shaped member 75ᵃ to hold the detent 90ᵃ in its proper position.

On the boom extension 75ᵇ are two uprights 92 and 93 which are connected together with a link 94. Pivoted on the upright member 92 is an L-shaped spacing member 95 having a notch 95ᵃ in a position to engage the detent 90ᵃ when the axis of the extension 75ᵇ is in prolongation of the axis of the boom 75. There is also a notch 95ᵇ provided to engage the detent 90ᵃ when the extension 75ᵇ is raised.

When it is desired to lift the extension 75ᵇ, from the platform, it is only necessary to pull on the lifting cord 97. The first result is that the L-shaped member 95 acting as a bell-crank lever, lifts the notch 95ᵃ from engagement with the detent 90ᵃ. A further lifting, raises the extension 75ᵇ to the position illustrated in Figure 9.

To lower the extension 75ᵇ, it is simply necessary to give the cord 97 a quick pull, then release the same to permit the extension 75ᵇ to be swung outwardly until the notch 95ᵃ engages the detent 90ᵃ.

In the present embodiment, two hinged rear curtain frames and at each side a single wide curtain frame are illustrated. With varying widths and under different conditions, the details of these constructions would be varied to suit the conditions.

While I have illustrated and described one embodiment by which my invention can be carried out, I desire to have it understood that the illustration and description are merely exemplary and that modifications and changes may be made without departing from the spirit of the invention and within the scope of the appended claims.

The process herein described and claimed, is described in my prior copending application filed July 26, 1932, Serial Number 624,783, now Patent No. 2,040,845 of May 19, 1936, of which this is a division.

Having described by invention, what I claim and desire to secure by Letters Patent is:—

1. The process of treating plants which comprises forcing dust-laden air continuously in at the forward end of an inverted pliable-edged chamber and out at the lower rear of the chamber, dust-laden air being confined within the chamber as the chamber is moved over the field and being permitted to escape only adjacent the ground.

2. The process of treating plants which consists of forcing air laden with a parasiticide down against the ground and undersides of the plant leaves and toward a chamber, to turn over and treat the undersides of the lower leaves, then retaining the plant for a time in the chamber as the chamber passes over the successive plants.

3. The process of treating plants which comprises the forcing of parasiticide-laden air downwardly toward the ground in the direction of the interior of a chamber, the movement of the chamber over growing plants in a manner to bring the plants into the path of the parasiticide-laden air to turn over the leaves closely adjacent the ground to contact the lower sides thereof, the confining of the air within the chamber and then releasing it in a wide ribbon-like current beneath the rear wall of the chamber to again turn over the plant leaves for contact of the parasiticide-laden air with the lower sides thereof.

4. The process of treating plants which comprises the forcing of parasiticide-laden air in a plurality of narrow ribbon-like streams downwardly toward the ground in the direction of the interior of a chamber, the movement of the chamber over growing plants in a manner to bring the plants into the paths of the parasiticide-laden air to turn over the leaves closely adjacent the ground to contact the lower sides thereof, the confining of the air within the chamber and then releasing it in a wide ribbon-like current beneath the rear wall of the chamber to again turn over the plant leaves for contact of the parasiticide-laden air with the lower sides thereof.

DANIEL C. HEIM.